United States Patent
Ozu et al.

(10) Patent No.: US 9,597,781 B2
(45) Date of Patent: Mar. 21, 2017

(54) ASSEMBLY JIG FOR USE IN ASSEMBLY OF LARGE STRUCTURE

(75) Inventors: Ichiro Ozu, Tokyo (JP); Kentaro Irie, Tokyo (JP); Kazunori Kamiya, Tokyo (JP); Daisuke Kinugasa, Tokyo (JP); Junji Nagata, Tokyo (JP); Sachio Takeyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 670 days.

(21) Appl. No.: 13/990,002

(22) PCT Filed: Jan. 13, 2012

(86) PCT No.: PCT/JP2012/050612
§ 371 (c)(1),
(2), (4) Date: May 28, 2013

(87) PCT Pub. No.: WO2012/108227
PCT Pub. Date: Aug. 16, 2012

(65) Prior Publication Data
US 2013/0241130 A1   Sep. 19, 2013

(30) Foreign Application Priority Data
Feb. 10, 2011   (JP) .................................. 2011-027765

(51) Int. Cl.
*B25B 11/02*   (2006.01)
*B64F 5/00*   (2006.01)
*B62B 3/08*   (2006.01)

(52) U.S. Cl.
CPC ................ *B25B 11/02* (2013.01); *B62B 3/08* (2013.01); *B64F 5/0009* (2013.01); *B64F 5/0036* (2013.01)

(58) Field of Classification Search
CPC .... B23P 2700/01; B25B 11/007; B25B 11/02; B60P 3/002; B62B 5/00;
(Continued)

(56) References Cited

U.S. PATENT DOCUMENTS 897,853 A * 9/1908 Scheido .......................... 410/51
2,314,319 A * 3/1943 Smith ............................. 269/45
(Continued)

FOREIGN PATENT DOCUMENTS

CN   101272956   9/2008
DE   710420   9/1941
(Continued)

OTHER PUBLICATIONS

International Search Report issued Apr. 10, 2012 in International (PCT) Application No. PCT/JP2012/050612.
(Continued)

*Primary Examiner* — Joseph J Hail
*Assistant Examiner* — Arman Milanian
(74) *Attorney, Agent, or Firm* — Wenderoth, Lind & Ponack, L.L.P.

(57) ABSTRACT

An assembly jig includes an upper jig frame that is provided above a longitudinal outer edge of a large structure, a lower jig frame that is provided below a longitudinal outer edge of the large structure, a connecting jig frame that connects the upper jig frame and the lower jig frame to each other, three supporting parts for supporting the lower jig frame from below, and a jig leg portion that is provided perpendicular to the direction in which the lower jig frame extends and parallel to a ground surface. The supporting parts are provided at three portions that are respectively located under two end portions of the jig leg portion and under the lower jig frame, and arrangement positions of the supporting parts
(Continued)

provided at the three portions form a substantially triangular shape when seen from above.

3 Claims, 7 Drawing Sheets

(58) Field of Classification Search
CPC ......... B62B 2301/04; B64C 2700/6233; B64F 5/0009; B64F 5/0036; B66F 7/10; B66F 7/28

See application file for complete search history.

(56) References Cited

U.S. PATENT DOCUMENTS

| | | | | |
|---|---|---|---|---|
| 2,335,692 A | * | 11/1943 | Murray | 414/346 |
| 2,370,083 A | * | 2/1945 | Smith | B64F 5/0009 29/462 |
| 2,375,363 A | * | 5/1945 | Hokanson | 280/47.34 |
| 3,738,515 A | * | 6/1973 | Monten | 414/800 |
| D265,391 S | * | 7/1982 | Dearing | D34/18 |
| 4,572,531 A | * | 2/1986 | Elia | E01H 5/066 280/62 |
| 4,708,251 A | | 11/1987 | Picard et al. | |
| 5,358,264 A | * | 10/1994 | Hewitt | B62B 3/10 280/79.11 |
| 5,598,760 A | | 2/1997 | Sucic et al. | |
| 5,653,351 A | | 8/1997 | Grout et al. | |
| 5,927,736 A | | 7/1999 | Salfinger et al. | |
| D467,402 S | * | 12/2002 | DiStaulo | D34/28 |
| 6,823,604 B2 | * | 11/2004 | Kato | 33/568 |
| 7,300,063 B1 | * | 11/2007 | Prizmich | B62B 5/0083 280/47.15 |
| 2002/0078545 A1 | | 6/2002 | Munk et al. | |
| 2002/0195524 A1 | | 12/2002 | Amaoka et al. | |
| 2003/0207742 A1 | | 11/2003 | Hazlehurst et al. | |
| 2006/0266885 A1 | | 11/2006 | Hardaker et al. | |
| 2012/0110816 A1 | * | 5/2012 | Groves | B62B 3/10 29/428 |

FOREIGN PATENT DOCUMENTS

| | | | | |
|---|---|---|---|---|
| DE | 725369 | | 9/1942 | |
| DE | 20 2008 013 438 | | 4/2010 | |
| EP | 0 888 202 | | 8/2005 | |
| FR | 1078670 A | * | 11/1954 | ............... B62B 3/08 |
| GB | 572377 A | * | 6/1941 | |
| GB | 585408 A | * | 5/1945 | ............ B64F 5/0009 |
| GB | 703239 A | * | 3/1950 | ............ B64F 5/0009 |
| JP | 5-14697 | | 2/1993 | |
| JP | 6-183477 | | 7/1994 | |
| JP | 10-502593 | | 3/1998 | |
| JP | 10-129493 | | 5/1998 | |
| JP | 11-239986 | | 9/1999 | |
| JP | 2000-506816 | | 6/2000 | |
| JP | 2001-30997 | | 2/2001 | |
| JP | 2006-502010 | | 1/2006 | |
| JP | 2006-224833 | | 8/2006 | |
| JP | 2006224833 A | * | 8/2006 | ............. B60B 33/00 |
| SU | 1824831 | | 5/1996 | |
| WO | 96/14217 | | 5/1996 | |
| WO | 97/34734 | | 9/1997 | |
| WO | 2010/069536 | | 6/2010 | |

OTHER PUBLICATIONS

Written Opinion of the International Searching Authority issued Apr. 10, 2012 in International (PCT) Application No. PCT/JP2012/050612.
Extended European Search Report issued Jul. 29, 2014 in corresponding European patent application No. 12745264.7.
Office Action issued Oct. 10, 2014 in corresponding Chinese patent application No. 201280003889.8 (with English translation).
Office Action issued Nov. 4, 2014 in corresponding Japanese patent application No. 2011-027765 (with English translation).
Notice of Allowance issued Mar. 4, 2015 in corresponding Russian patent application No. 2013123800 (with English translation).
Decision to Grant a Patent issued Nov. 4, 2015 in corresponding Japanese patent application No. 2011-027765.
Decision to Grant a Patent issued Sep. 2, 2015 in corresponding Canadian patent application No. 2819220.
Decision to Grant a Patent issued Jun. 3, 2015 in corresponding Chinese patent application No. 201280003889.8.
Office Action issued Jun. 30, 2015 in corresponding Japanese patent application No. 2011-027765 (with English translation).

* cited by examiner

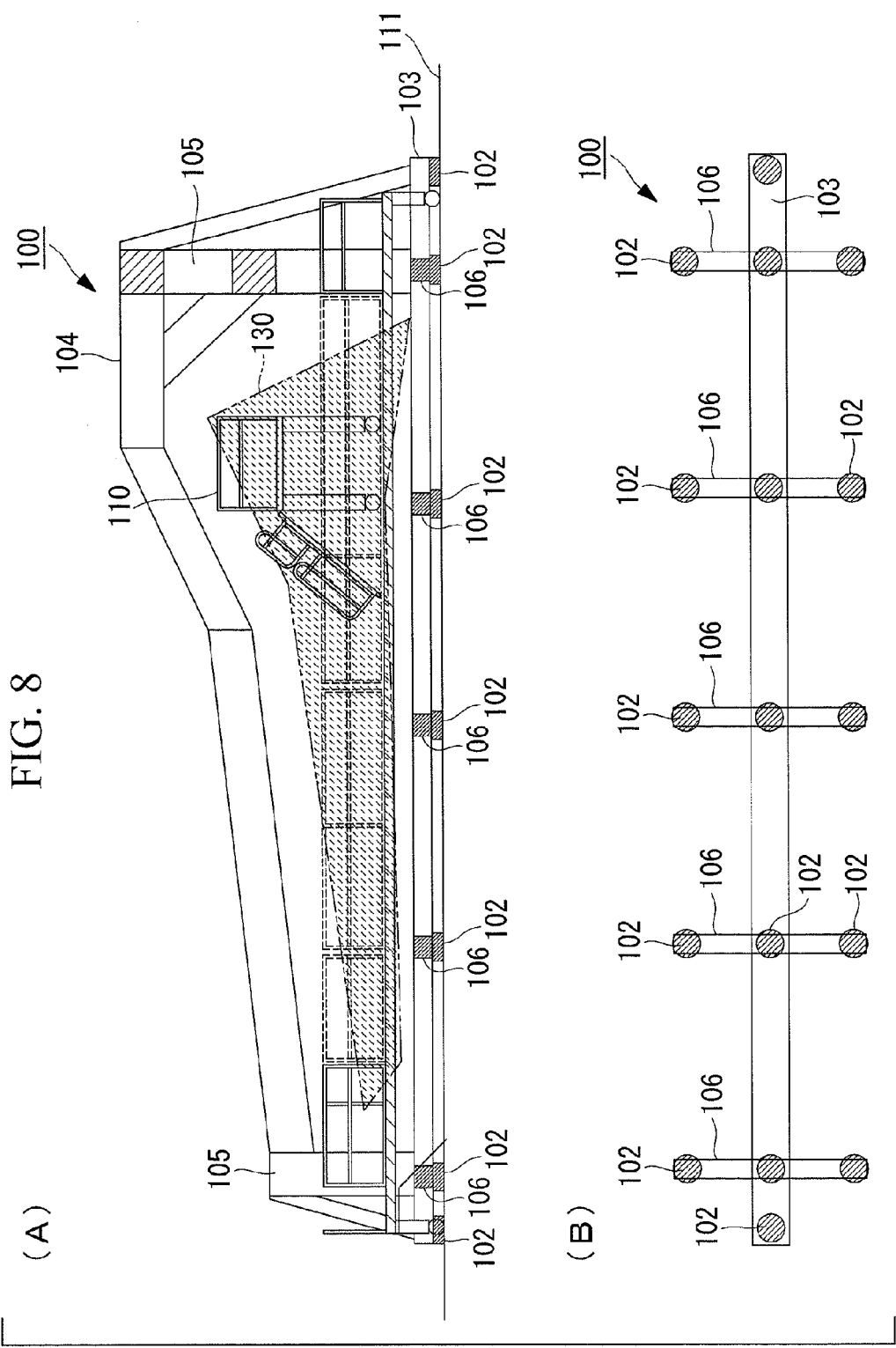

ASSEMBLY JIG FOR USE IN ASSEMBLY OF LARGE STRUCTURE

TECHNICAL FIELD

The present invention relates to an assembly jig that is used during assembly of a structure having a large size and requiring strict accuracy, such as a wing of an aircraft or a vane of a windmill.

BACKGROUND ART

Generally, when a large structure such as a main wing of an aircraft is assembled by forming holes in panels and fixing the panels by riveting, a large assembly jig 100 as shown in FIGS. 8(A) and 8(B) is used. FIG. 8(A) shows a front view of the assembly jig 100, and FIG. 8(B) shows a bottom view of the assembly jig 100 shown in FIG. 8(A). As shown in FIG. 8(A), the assembly jig 100 is supported on a ground surface 111 via a plurality of (for example, eighteen, as shown in FIG. 8(B)) supporting parts 102, the ground surface 111 having been reinforced in accordance with the size of the assembly jig 100 to increase the rigidity of the ground surface 111.

The assembly jig 100 that is supported by the supporting parts 102 from below in this manner mainly includes a lower jig frame 103, an upper jig frame 104 that extends in a longitudinal direction of a large structure 130, such as a main wing, to be assembled and is provided above the large structure 130, and connecting jig frames 105 that extend upward from the lower jig frame 103 toward the upper jig frame 104, and locating devices (not shown) that are provided on the lower jig frame 103 and the upper jig frame 104, support the large structure 130 from below and above, and fix the large structure 130 to the assembly jig 100.

As shown in FIG. 8(B), a plurality of (for example, five) jig leg portions 106 are provided on the lower jig frame 103 of the assembly jig 100, the jig leg portions 106 being provided perpendicular to the direction in which the lower jig frame 103 extends and parallel to the ground surface 111 (see FIG. 8(A)). The supporting parts 102 are provided under the two end portions of each of the plurality of jig leg portions 106 and under the two end portions of the lower jig frame 103. The assembly jig 100 is supported by the ground surface 111 via the supporting parts 102, and thus the load of the assembly jig 100 and the large structure 130 mounted on the assembly jig 100 is borne by the ground surface 111.

This assembly jig 100 is equipped with a work platform 110 that is movable parallel to a longitudinal axis direction of the assembly jig 100. A worker (not shown) stands on the work platform 110 that is provided as described above and performs an assembly work for assembling the large structure 130 by forming holes in panels (not shown) of the large structure 130, riveting the panels, and so on. At this time, the shape and the accuracy of the large structure 130 to be assembled are maintained due to the rigidity of the ground surface 111 with which the supporting parts 102, which are provided at the two end portions of each of the plurality of jig leg portions 106 and the two end portions of the lower jig frame 103, come into contact.

Patent Literature 1 discloses a carrier that is used during assembly of a large structure, the carrier enabling the load of the carrier on which a glass substrate of a large liquid crystal display panel is mounted and which thus has a heavy weight to be uniformly applied to the wheels of the carrier even if there is a protrusion/recess on a route along which the carrier moves.

CITATION LIST

Patent Literature

{PTL 1}
 Japanese Unexamined Patent Application, Publication No. 2006-224833

SUMMARY OF INVENTION

Technical Problem

However, in the case of the assembly jig 100 as shown in FIGS. 8(A) and 8(B), if a change such as land subsidence occurs to the ground surface 111, the assembly jig 100 deforms, and the accuracy of the large structure 130 to be assembled can no longer be maintained. In order to prevent this situation, it is necessary to make fine adjustments to the height of the supporting part 102 whenever a periodic inspection of the assembly jig 100 is performed.

Moreover, changes that occur to the ground surface 111 are related also to a temperature difference, the tides, and the like. For this reason, changes may occur to the ground surface 111 depending on the time of day. Thus, there has been a problem in that when performing an operation (boring operation) of forming a precision hole, such as a hole for an interference fit, in the large structure 130 that is assembled using the assembly jig 100, there is a limitation to the time of day to work.

Furthermore, the assembly jig 100 is installed on the ground surface 111 that has been reinforced by digging up the ground surface 111 in accordance with the size of the assembly jig 100 and pouring concrete therein. For this reason, there has been a problem in that once the assembly jig 100 is installed, it is difficult to change the location of the assembly jig 100.

Moreover, although the invention described in Patent Literature 1 discloses making the load that is applied to a floor serving as the route along which the carrier moves to be uniformly distributed, no mention is made to preventing deformation of the carrier and maintaining the accuracy in case a change occurs to the ground surface.

The present invention has been made in view of circumstances as described above, and it is an object thereof to provide an assembly jig for use in assembly of a large structure that can prevent deformation due to a change that occurs to the ground surface and maintain the accuracy.

Solution to Problem

In order to solve the problems, an assembly jig for use in assembly of a large structure according to the present invention employs the following solutions.

That is to say, an assembly jig for use in assembly of a large structure according to the present invention includes an upper jig frame that is provided above a longitudinal outer edge of a large structure, a lower jig frame that is provided below a longitudinal outer edge of the large structure, a connecting jig frame that connects the upper jig frame and the lower jig frame to each other, three supporting parts for supporting the lower jig frame from below, and a jig leg portion that is provided perpendicular to a direction in which the lower jig frame extends and parallel to a ground surface, wherein the supporting parts are provided at three portions that are respectively located under two end portions of the jig leg portion and under the lower jig frame, and arrangement positions of the supporting parts provided at the three portions form a substantially triangular shape when seen from above.

The supporting parts are provided at the three portions, which are respectively located under the two end portions of the jig leg portion and under the lower jig frame, the jig leg portion being provided perpendicular to the direction in which the lower jig frame, which is provided below the outer edge of the large structure, extends and parallel to the ground surface. The supporting parts provided at the three portions are arranged so as to form a substantially triangular shape when seen from above. Since the assembly jig is supported at three points in this manner, even if a change occurs to the ground surface due to a temperature change, the tides, land subsidence, or the like, the large structure can be supported due to the rigidity of the assembly jig. Accordingly, the shape and the accuracy of assembly of the large structure to be assembled can be maintained without being affected by the change that occurs to the ground surface.

Moreover, since the large structure is no longer affected by a change that occurs to the ground surface, the necessity to adjust the height of the assembly jig during periodic inspections of the assembly jig is eliminated.

In the assembly jig for use in assembly of a large structure according to the present invention, it is preferable that each of the supporting parts has a supporting member that is provided such that a substantially central portion thereof in a direction in which the supporting member extends is supported by a swing member that is provided on the jig leg portion or the lower jig frame and such that the supporting member extends in a direction perpendicular to a direction in which the jig leg portion or the lower jig frame extends, and legs that are provided under the supporting member and come into contact with the ground surface.

Each of the supporting parts has the supporting member, which is provided such that the substantially central portion thereof in the direction in which the supporting member extends is supported by the swing member and such that the supporting member extends in a direction perpendicular to the direction in which the jig leg portion or the lower jig frame extends. As described above, by arranging the supporting member and the jig leg portion or the lower jig frame in an overlapping manner such that the supporting member extends in a direction that crosses the direction in which the jig leg portion or the lower jig frame extends, it is possible to distribute the load of the assembly jig and the large structure mounted on the assembly jig and reduce load concentration on the ground surface. Moreover, the substantially central portion of the supporting member in the direction in which the supporting member extends is supported by the jig leg portion or the lower jig frame via the swing member, and the legs, which comes into contact with the ground surface, is provided under each of the two end portions of the supporting member. For this reason, each supporting part swings like a seesaw, thereby eliminating inclination of the direction in which the supporting member extends, and the assembly jig can be supported by point support. Accordingly, the shape and the accuracy of assembly of the large structure can be maintained without being affected by the change that occurs to the ground surface, and the necessity for a reinforcement work for reinforcing the ground surface in accordance with the size of the assembly jig is eliminated.

Moreover, since each supporting part swings like a seesaw, any change due to protrusions and recesses in the ground surface under the assembly jig can be absorbed.

In the above-described assembly jig for use in assembly of a large structure, it is preferable that a plurality of intermediate supporting members are provided under two end portions of the supporting member such that substantially central portions thereof in directions in which the intermediate supporting members extend are supported by respective swing members, and the plurality of intermediate supporting members are provided so as to extend in a direction perpendicular to a direction in which the supporting member or an intermediate supporting member located above extends.

The plurality of intermediate supporting members are provided under the two end portions of the supporting member such that the substantially central portions thereof in the directions in which the intermediate supporting members extend are supported by the respective swing members, and the plurality of intermediate supporting members are provided so as to extend in a direction perpendicular to the direction in which the supporting member or an intermediate supporting member that is located above extends. By providing swingable intermediate supporting members in a plurality of layers in this manner, it is possible to further distribute the load of the assembly jig and the large structure mounted on the assembly jig.

In the above-described assembly jig for use in assembly of a large structure, it is preferable that the supporting member is mounted on an upper face of the jig leg portion or the lower jig frame.

The supporting member is mounted on the upper face of the jig leg portion or the lower jig frame. This makes it possible to lower the center of gravity of the assembly jig and support the assembly jig at a lower position. Accordingly, the assembly jig can be stabilized.

In the above-described assembly jig for use in assembly of a large structure, it is preferable that the legs are wheels that roll on the ground surface.

A wheel that rolls on the ground surface is used as the leg that comes into contact with the ground surface. This makes it possible to move the assembly jig. Accordingly, the location of the assembly jig within a factory can be changed in accordance with production fluctuations of the large structure.

Moreover, since each supporting part has a seesaw structure, when the assembly jig is moved, even if a wheel goes up onto an obstacle or the like on the ground surface, the shift of the center of gravity of the assembly jig can be reduced. Accordingly, the assembly jig can be moved with stability.

Advantageous Effects of Invention

According to the present invention, the supporting parts are provided at the three portions that are respectively located under the two end portions of the jig leg portion and under the lower jig frame, the jig leg portion being provided perpendicular to the direction in which the lower jig frame that is provided below the outer edge of the large structure extends and parallel to the ground surface, and the supporting parts are arranged so as to form a substantially triangular shape when the supporting parts provided at the three portions are seen from above. Since the assembly jig is supported at three points in this manner, even if a change occurs to the ground surface due to a temperature change, the tides, land subsidence, or the like, the large structure can be supported due to the rigidity of the assembly jig. Accordingly, the shape and the accuracy of assembly of the large structure to be assembled can be maintained without being affected by the change that occurs to the ground surface.

Moreover, since the large structure is no longer affected by a change that occurs to the ground surface, the necessity to adjust the height of the assembly jig during periodic inspections of the assembly jig is eliminated.

BRIEF DESCRIPTION OF DRAWINGS

FIGS. 8(A) and 8(B) schematically shows the configuration of a conventional assembly jig that is used during assembly of a large structure, FIG. 8(A) showing a front view thereof and FIG. 8(B) showing a bottom view of the assembly jig shown in FIG. 8(A).

DESCRIPTION OF EMBODIMENTS

First Embodiment

Figure 1:
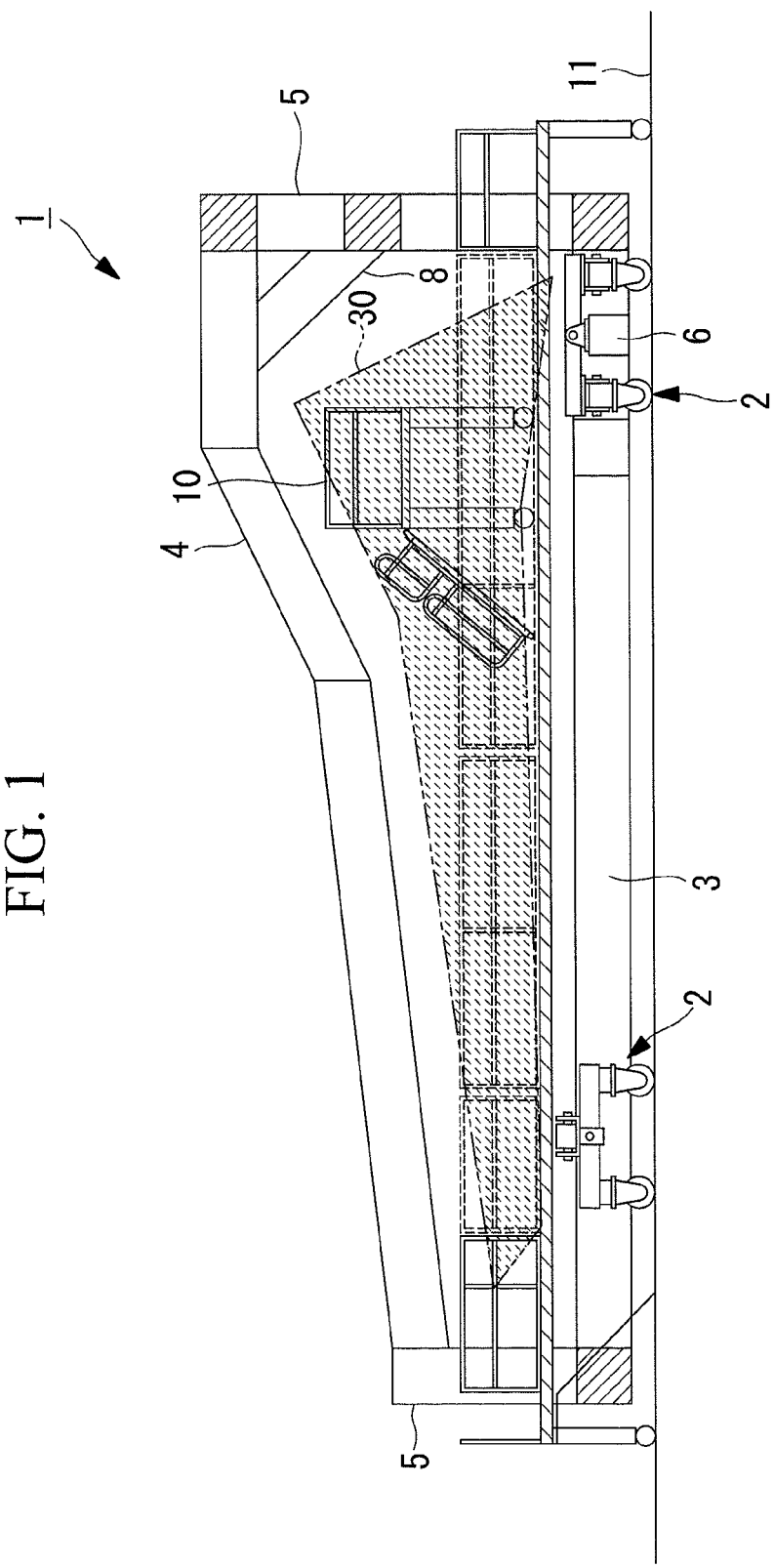
FIG. 1 is a front view of an assembly jig that is used during assembly of a large structure according to a first embodiment of the present invention.

The following is a description of a first embodiment of the present invention, with reference to FIGS. 1 to 7.

FIGS. 1 to 5 show a large assembly jig that is used during assembly of a main wing of an aircraft.

An assembly jig 1 is used when forming holes in panels (not shown) that constitute a large structure such as a main wing of an aircraft and reveting the panels to assemble the main wing (large structure) 30 of an aircraft. The assembly jig 1 is supported on a ground surface 11 via supporting parts 2 that are provided at three portions (see FIG. 2).

The assembly jig 1 mainly includes an upper jig frame 4 that is provided above a longitudinal outer edge of the main wing 30, a lower jig frame 3 that is provided below a longitudinal outer edge of the main wing 30, connecting jig frames 5 that connect the lower jig frame 3 and the upper jig frame 4 to each other, and locating devices 7 (see FIG. 2) that are provided on the lower jig frame 3 and the upper jig frame 4 and that support the main wing 30 from below and above and fix it to the assembly jig 1.

The lower jig frame 3, the upper jig frame 4, and the connecting jig frames 5 that constitute the assembly jig 1 are provided so as to surround the outer edges of the main wing 30. Angular pipes made of aluminum or iron and having a rectangular shape in a cross section that is perpendicular to the direction in which the angular pipes extend are used for the lower jig frame 3, the upper jig frame 4, and the connecting jig frames 5. For example, in the case of the assembly jig 1 for use in assembly of a main wing 30 having a weight of about 1.7 t, the longitudinal length of the assembly jig 1 is set to about 17 m, the height of the assembly jig 1 from the ground surface 11 is set to about 7 m, and the total weight of the assembly jig 1 and the main wing 30 is set to about 24 t to 25 t.

The plurality of locating devices 7 that support the main wing 30 are provided on the lower jig frame 3 and the upper jig frame 4 that are provided so as to be outside of the longitudinal outer edges of the main wing 30. The locating devices 7 extend upward from the lower jig frame 3 or downward from the upper jig frame 4 to support the main wing 30.

Figure 2:
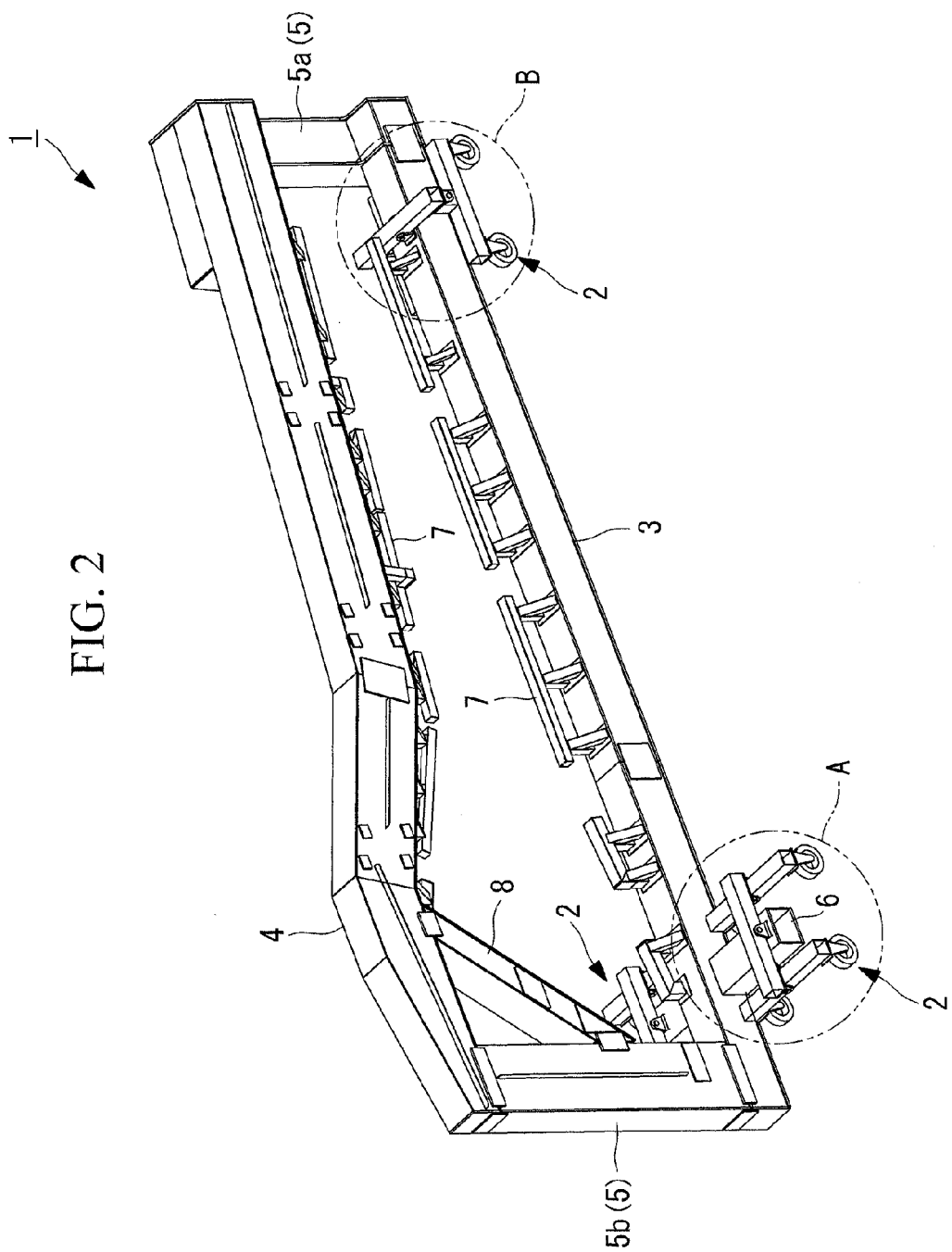
FIG. 2 is a perspective view of the assembly jig shown in FIG. 1.

The upper jig frame 4 that constitutes the assembly jig 1 is formed so as to conform to the shape of the longitudinal outer edge of the main wing 30 as shown FIGS. 1 and 2 by connecting a plurality of angular pipes at angles to one another by welding. A plurality of locating devices 7 that extend downward and support the main wing 30 are provided on this upper jig frame 4.

The connecting jig frames 5 that constitute the assembly jig 1 are provided at the two longitudinal end portions of the lower jig frame 3 and the upper jig frame 4, and extend vertically upward from the lower jig frame 3 toward the upper jig frame 4 to connect the lower jig frame 3 and the upper jig frame 4 to each other. Since the upper jig frame 4 is curved as shown in FIGS. 1 and 2 so as to conform to the shape of the longitudinal outer edge of the main wing 30, the connecting jig frames 5, which are provided at the two longitudinal end portions of the lower jig frame 3 and the upper jig frame 4, have different lengths in the longitudinal direction.

Figure 3:
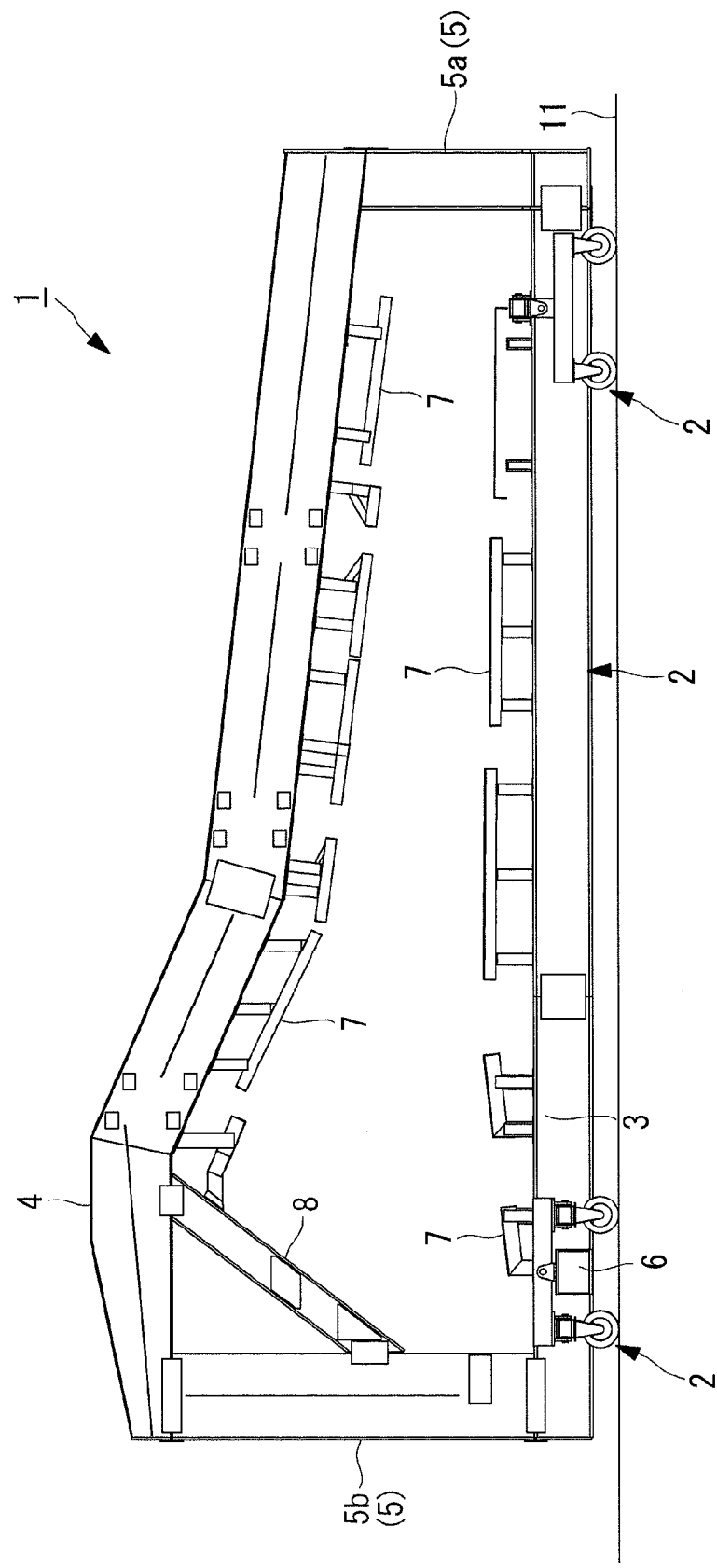
FIG. 3 is a front view of the assembly jig shown in FIG. 2.

As shown in FIGS. 2 and 3, the connecting jig frames 5 provided at these two portions are, respectively, a connecting jig frame 5a (hereinafter referred to as "front connecting jig frame") having the shorter length and a connecting jig frame 5b (hereinafter referred to as "rear connecting jig frame") having the longer length. In FIGS. 2 and 3, the connecting jig frame 5 on the right side is the front connecting jig frame 5a, and the connecting jig frame 5 on the left side is the rear connecting jig frame 5b.

A diagonal jig frame 8 is provided on the rear connecting jig frame 5b, the diagonal jig frame 8 diagonally extending toward the upper jig frame 4 from a position in the middle of the rear connecting jig frame 5b in the direction in which the rear connecting jig frame 5b extends and connecting the rear connecting jig frame 5b and the upper jig frame 4 to each other. By providing the diagonal jig frame 8 between the rear connecting jig frame 5b and the upper jig frame 4 in this manner, the assembly jig 1 is reinforced.

Figure 4:
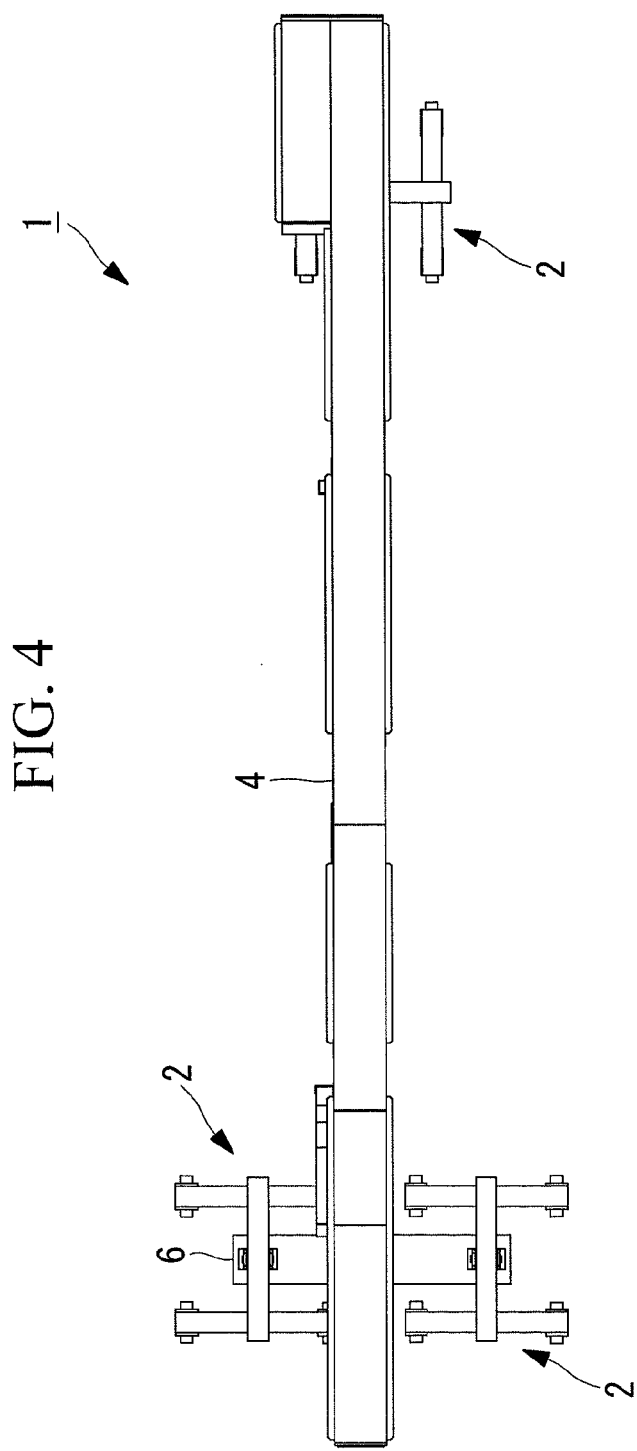
FIG. 4 is a plan view of the assembly jig shown in FIG. 2.
Figure 5:
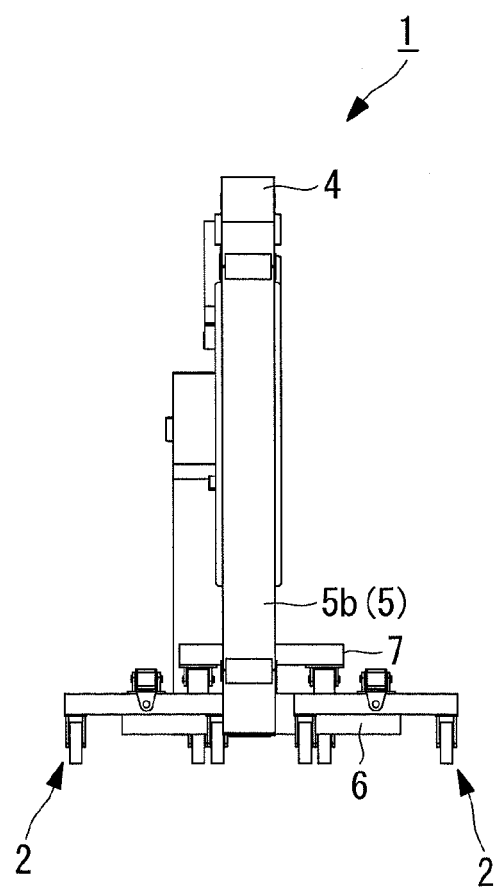
FIG. 5 is a left side view of the assembly jig shown in FIG. 2.

The lower jig frame 3 that constitutes the assembly jig 1 has a substantially linear shape. The lower jig frame 3 is provided under the upper jig frame 4 such that the upper jig frame 4 is superposed on the lower jig frame 3 when the assembly jig 1 is seen from above as shown in FIG. 4. The plurality of locating devices 7 (see FIG. 2) that extend upward and support the main wing 30 are provided on the lower jig frame 3.

As shown in FIG. 2, the lower jig frame 3 is provided with a single jig leg portion 6 in the vicinity of the rear connecting jig frame 5b, the jig leg portion 6 being provided perpendicular to the direction in which the lower jig frame 3 extends and parallel to the ground surface 11 (see FIG. 1). The supporting parts 2 are provided under the two end portions of the jig leg portion 6 and under the lower jig frame 3 in the vicinity of the front connecting jig frame 5a. The assembly jig 1 is supported on the ground surface 11 via the supporting parts 2 provided at these three portions, and thus the load of the assembly jig 1 and the main wing 30 (see FIG. 1) mounted on the assembly jig 1 is borne by the ground surface 11.

The jig leg portion 6 is provided in the vicinity of the rear connecting jig frame 5b and extends perpendicular to the direction in which the lower jig frame 3 extends and parallel to the ground surface. An angular pipe having a rectangular shape in a cross section that is perpendicular to the direction in which the angular pipe extends and having a smaller cross section than the lower jig frame 3 is used for the jig leg portion 6. The supporting parts 2 are provided under the two end portions of the jig leg portion 6.

Figure 6:
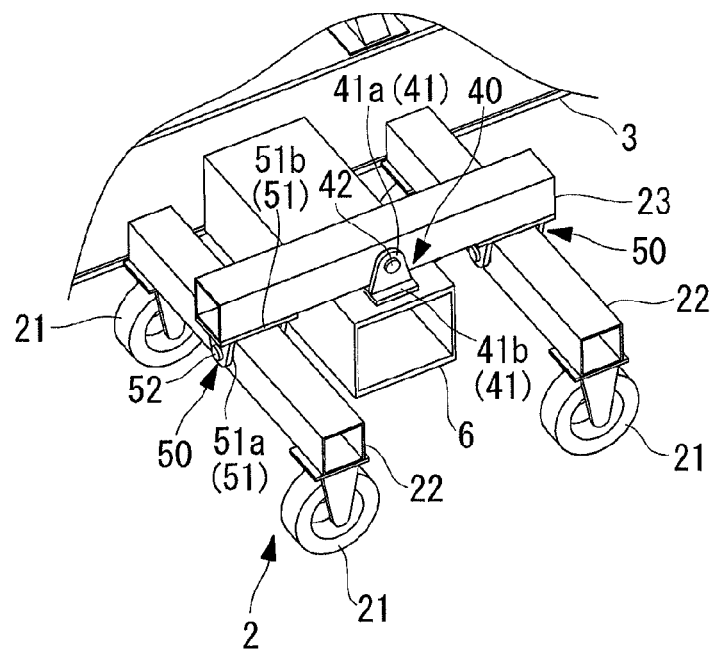
FIG. 6 is a fragmentary enlarged view of portion A shown in FIG. 2.

Each of the supporting parts 2 that are provided on the jig leg portion 6 has, as shown in FIG. 6, a supporting member 23 that is provided such that a substantially central portion thereof in the direction in which the supporting member 23 extends is supported by a swing receiving member (swing member) 40 that is provided on an upper face of each of the two end portions of the jig leg portion 6.

A plurality (one) of intermediate supporting members 22 are provided under the two end portions of each supporting member 23 such that a substantially central portion of each of the intermediate supporting members 22 in the direction in which the intermediate supporting member 22 extends is supported by a swing suspending member (swing member) 50. The intermediate supporting member 22 is provided so as to extend in a direction perpendicular to the direction in which the supporting member 23, which is located above the intermediate supporting member 22, extends.

Angular pipes are used for the supporting members 23 and the intermediate supporting members 22, the angular pipes having the same rectangular shape in cross sections that are perpendicular to the directions in which the angular pipes extend. Wheels (legs) 21 that come into contact with the ground surface 11 (see FIG. 2) are provided under the both end portions of the intermediate supporting members 22. The wheels 21 are capable of rolling on the ground surface 11.

The substantially central portions of the supporting members 23 in the direction in which the supporting members 23 extend are supported by the respective swing receiving members 40 that are provided on the upper face of the jig leg portion 6. Each swing receiving member 40 has a swing receiving member main body 41 and a coupling pin 42. The swing receiving member main body 41 has two substantially triangular plate portions 41a (FIG. 6 shows only one of them) that protrude upward, and a bottom face portion 41b that is connected to the bases of the two substantially triangular plate portions 41a and provided on the upper face of the jig leg portion 6 parallel to the upper face. The two plate portions 41a are provided parallel to each other, and a space into which the supporting member 23 can be inserted is left between the plate portions 41a.

The substantially central portion of the supporting member 23 in the direction in which the supporting member 23 extends is inserted between the plate portions 41a of the swing receiving member main body 41 so as to be sandwiched therebetween. The coupling pin 42 penetrates these plate portions 41a and the supporting member 23 sandwiched between the plate portions 41a and extends perpendicular to the direction in which the supporting member 23 extends and parallel to the upper face of the jig leg portion 6. Thus, the supporting member 23 can swing about the coupling pin 42 of the swing receiving member 40 that is provided on the upper face of the jig leg portion 6, and consequently is swingably supported by the jig leg portion 6.

The swing suspending members 50 that swingably support the substantially central portions of the respective intermediate supporting members 22 in the direction in which the intermediate supporting members 22 extend are provided at the two end portions of the supporting member 23. Each swing suspending member 50 has a swing suspending member main body 51 and a coupling pin 52. The swing suspending member main body 51 has two substantially triangular plate portions 51a (FIG. 6 shows only one of them) that protrude downward and a bottom face portion 51b that is connected to the bases of the two substantially triangular plate portions 51a and provided on a lower face of the supporting member 23 parallel to the lower face. The two plate portions 51a are provided parallel to each other, and a space into which the intermediate supporting member 22 can be inserted is left between the plate portions 51a.

The substantially central portion of the intermediate supporting member 22 in the direction in which the intermediate supporting member 22 extends is inserted between the plate portions 51a of the swing suspending member 50 so as to be sandwiched therebetween. The coupling pin 52 penetrates these plate portions 51a and the intermediate supporting member 22 sandwiched between the plate portions 51a and extends perpendicular to the direction in which the intermediate supporting member 22 extends and parallel to the lower face of the supporting member 23. Thus, the intermediate supporting member 22 can swing about the coupling pin 52 of the swing suspending member 50 that is provided on the supporting member 23, and consequently is swingably supported by the supporting member 23.

Figure 7:
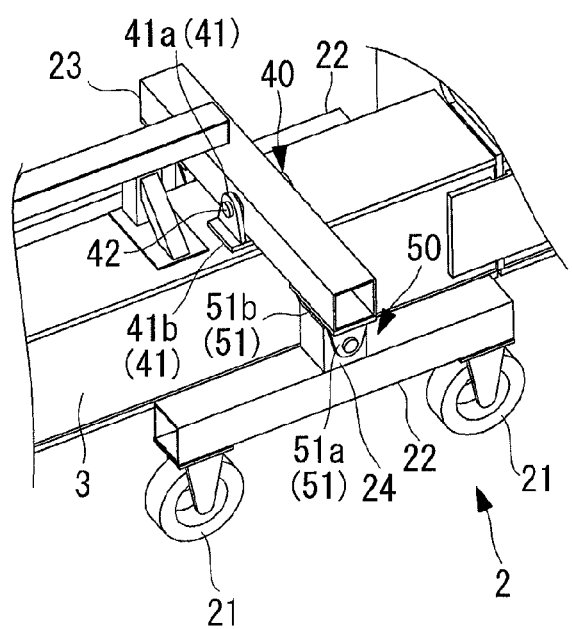
FIG. 7 is a fragmentary enlarged view of portion B shown in FIG. 2.

As shown in FIG. 7, the supporting part 2 that is provided under the lower jig frame 3 in the vicinity of the front connecting jig frame 5a has a supporting member 23 that is provided such that a substantially central portion thereof in the direction in which the supporting member 23 extends is supported by a swing receiving member (swing member) 40 that is provided on an upper face of the lower jig frame 3.

A plurality (one) of intermediate supporting members 22 are provided under the two end portions of the supporting member 23 such that substantially central portions thereof in the direction in which the intermediate supporting members 22 extend are supported by respective swing suspending members (swing members) 50, and these intermediate supporting members 22 are provided so as to extend in a direction perpendicular to the direction in which the supporting member 23, which is located above the intermediate supporting members 22, extends.

Angular pipes are used for the supporting member 23 and the intermediate supporting members 22, the angular pipes having the same rectangular shape in cross sections that are perpendicular to the directions in which the angular pipes extend. Wheels (legs) 21 that come into contact with the ground surface 11 (see FIG. 2) are provided under the both end portions of the intermediate supporting members 22.

The substantially central portion of the supporting member 23 in the direction in which the supporting member 23 extends is supported by the swing receiving member 40 that is provided on the upper face of the lower jig frame 3. The swing receiving member 40 has a swing receiving member main body 41 and a coupling pin 42. The swing receiving member main body 41 has two substantially triangular plate portions 41a (FIG. 7 shows only one of them) that protrude upward, and a bottom face portion 41b that is connected to the bases of the two substantially triangular plate portions 41a and provided on the upper face of the lower jig frame 3 parallel to the upper face. The two plate portions 41a are provided parallel to each other, and a space into which the supporting member 23 can be inserted is left between the plate portions 41a.

The substantially central portion of the supporting member 23 in the direction in which the supporting member 23 extends is inserted between the plate portions 41a of the swing receiving member main body 41 so as to be sandwiched therebetween. The coupling pin 42 penetrates these plate portions 41a and the supporting member 23 sandwiched between the plate portions 41a and extends perpendicular to the direction in which the supporting member 23 extends and parallel to the upper face of the lower jig frame 3. Thus, the supporting member 23 can swing about the coupling pin 42 of the swing receiving member 40 that is provided on the upper face of the lower jig frame 3, and consequently is swingably supported by the lower jig frame 3.

The swing suspending members 50 that swingably support the substantially central portions of the respective intermediate supporting members 22 in the direction in which the intermediate supporting members 22 extend are provided at the two end portions of the supporting member 23. Each swing suspending member 50 has a swing suspending member main body 51 and a coupling pin 52. The swing suspending member main body 51 has two substantially triangular plate portions 51a that protrude downward, and a bottom face portion 51b that is connected to the bases of the two substantially triangular plate portions 51a (FIG. 7 shows only one of them) and provided on a lower face of the supporting member 23 parallel to the lower face. The two plate portions 51a are provided parallel to each other, and a space into which the intermediate supporting member 22 can be inserted is left between the plate portions 51a.

An end portion of an intermediate supporting vertical member 24 is inserted between the plate portions 51a of each swing suspending member 50 so as to be sandwiched therebetween, the intermediate supporting vertical member 24 connecting the substantially central portion of the intermediate supporting member 22 in the direction in which the intermediate supporting member 22 extends and the supporting member 23 to each other. The coupling pin 52 penetrates these plate portions 51a and the intermediate supporting vertical member 24 sandwiched between the plate portions 51a and extends perpendicular to the direction in which the intermediate supporting vertical member 24 extends and parallel to the lower face of the supporting member 23. Thus, the intermediate supporting member 22 can swing about the coupling pin 52 of the swing suspending member 50, which is provided on the supporting member 23, via the intermediate supporting vertical member 24, and consequently is swingably supported by the supporting member 23.

The intermediate supporting members 22 are swingably suspended from the supporting members 23 via the swing suspending members 50, and the supporting members 23 are supported on the upper face of the jig leg portion 6 and the upper face of the lower jig frame 3 via the swing receiving members 40. Thus, each supporting part 2 forms a seesaw structure.

As described above, the jig leg portion 6 or the lower jig frame 3, the intermediate supporting members 22, and the supporting member 23 are arranged in an overlapping manner such that the direction in which the jig leg portion 6 or the lower jig frame 3 and the intermediate supporting members 22 extend crosses the direction in which the supporting member 23 extends. Thus, the load of the assembly jig 1 and the main wing 30 that is mounted on the assembly jig 1 is applied in a distributed manner to the wheels 21 that are provided under the both end portions of the intermediate supporting members 22.

Moreover, the supporting parts 2 are made to have the seesaw structures by means of the intermediate supporting members 22, the supporting members 23, the swing receiving members 40, and the swing suspending members 50. Thus, inclination of the directions in which the intermediate supporting members 22 and the supporting members 23 extend can be eliminated.

As described above, the assembly jig 1 for use in assembly of a large structure such as the main wing 30 of an aircraft according to the present embodiment has the following effects.

The supporting parts 2 are provided at three portions that are respectively located under the two end portions of the jig leg portion 6 and under the lower jig frame 3, the jig leg portion 6 being provided perpendicular to the direction in which the lower jig frame 3, which is provided below the outer edge of the main wing (large structure) 30, extends and parallel to the ground surface 11, and the supporting parts 2 are arranged so as to form a substantially triangular shape when the supporting parts 2 provided at the three portions are seen from above. Since the assembly jig 1 can be supported at three points in this manner, even if a change occurs to the ground surface 11 due to a temperature change, the tides, land subsidence, or the like, the main wing 30 can be supported due to the rigidity of the assembly jig 1. Accordingly, the shape and the accuracy of assembly of the main wing 30 to be assembled can be maintained without being affected by a change that occurs to the ground surface 11.

Moreover, since the main wing 30 is no longer affected by a change that occurs to the ground surface 11, the necessity to adjust the height of the assembly jig 1 during periodic inspections of the assembly jig 1 is eliminated.

Each supporting part 2 has the supporting member 23 that is provided such that the substantially central portion thereof in the direction in which the supporting member 23 extends is supported by the swing receiving member (swing member) 40 and such that the supporting member 23 extends in a direction perpendicular to the direction in which the jig leg portion 6 or the lower jig frame 3 extends. By arranging the supporting member 23 and the jig leg portion 6 or the lower jig frame 3 in an overlapping manner such that the supporting member 23 extends in a direction that crosses the direction in which the jig leg portion 6 or the lower jig frame 3 extends, it is possible to distribute the load of the assembly jig 1 and the main wing 30 mounted on the assembly jig 1 and reduce load concentration on the ground surface 11. Moreover, one (a plurality of) intermediate supporting member 22 is provided under each of the two end portions of the supporting member 23 such that the substantially central portion thereof in the direction in which the intermediate supporting member 22 extends is supported by the swing suspending member (swing member) 50 and such that each intermediate supporting member 22 extends in a direction that crosses the direction in which the supporting member 23 extends, and the wheels (legs) 21 are provided under the two end portions of each intermediate supporting member 22. Therefore, each supporting part 2 swings like a seesaw, thereby eliminating inclination of the directions in which the supporting member 23 and the intermediate supporting members 22 extend, and the assembly jig 1 can be supported by point support. Accordingly, the shape and the accuracy of assembly of the main wing 30 can be maintained without being affected by the change that occurs to the ground surface 11, and the necessity for a reinforcement work for reinforcing the ground surface 11 in accordance with the size of the assembly jig 1 is eliminated.

Moreover, since each supporting part 2 swings like a seesaw, any change due to protrusions and recesses of the ground surface 11 under the assembly jig 1 can be absorbed.

By providing the swingable intermediate supporting members 22, it is possible to further distribute the load of the assembly jig 1 and the main wing 30 mounted on the assembly jig 1.

The supporting members 23 are mounted on the upper face of the jig leg portion 6 or the lower jig frame 3. This makes it possible to lower the center of gravity of the assembly jig 1 and support the assembly jig 1 at a lower position. Accordingly, the assembly jig 1 can be stabilized.

The wheels 21 rolling on the ground surface 11 are used as the legs that come into contact with the ground surface 11. This makes it possible to move the assembly jig 1. Therefore, the location of the assembly jig 1 within a factory can be changed in accordance with production fluctuations of the main wing 30.

Moreover, each supporting part 2 has a seesaw structure, and therefore when the assembly jig 1 is moved, even if a wheel 21 goes up onto an obstacle or the like on the ground surface 11, the shift of the center of gravity of the assembly jig 1 can be reduced. Accordingly, the assembly jig 1 can be moved with stability.

It should be noted that although the present embodiment has been described using the main wing 30 of an aircraft as the large structure, the present invention is not limited to this, and the large structure may also be a tail or a fuselage of an aircraft, a blade of a helicopter, or a vane of a windmill.

Moreover, although the present invention has been described assuming that the overall length of the assembly jig 1 is about 17 m and the total weight of the assembly jig 1 and the main wing 30 is about 24 t to 25 t, the overall length of the assembly jig 1 may also be about 5 m to 20 m depending on the overall length of the large structure to be assembled, and the total weight of the assembly jig 1 and the large structure may also be about 6 t to 30 t.

Second Embodiment

An assembly jig for use in assembly of a large structure according to this embodiment differs from the assembly jig of the first embodiment in that intermediate supporting members are provided in a plurality of layers, but otherwise, the assembly jig of this embodiment is the same as the assembly jig of the first embodiment. Accordingly, descriptions of like components will be omitted.

A plurality of intermediate supporting members are provided at each of the two end portions of a supporting member such that substantially central portions of the plurality of intermediate supporting members in the direction in which the intermediate supporting members extend are supported by respective swing suspending members (swing members). The plurality of (more than one layers of) intermediate supporting members are provided such that each intermediate supporting member extends in a direction perpendicular to the direction in which the supporting member or an intermediate supporting member located above extends.

As described above, the assembly jig for use in a large structure, such as a main wing of an aircraft, according to the present embodiment, has the following effects.

The plurality of (more than one layers of) intermediate supporting members are provided under each of the two end portions of the supporting members such that the substantially central portions thereof in the directions in which the intermediate supporting members extend are supported by the respective swing suspending members (swing members) and such that each intermediate supporting member extends in a direction perpendicular to the direction in which the corresponding supporting member or an intermediate supporting member located above extends. Providing swingable intermediate supporting members in a plurality of layers in this manner enables the load of the assembly jig and the main wing (large structure) mounted on the assembly jig to be further distributed when compared with the first embodiment.

REFERENCE SIGNS LIST

1 Assembly jig
2 Supporting part
3 Lower jig frame
4 Upper jig frame
5 Connecting jig frame
6 Jig leg portion
11 Ground surface
30 Large structure (main wing)

The invention claimed is:

1. An assembly jig for use in assembly of a large structure, comprising:
   an upper jig frame that is provided above a longitudinal edge of a large structure;
   a lower jig frame that is provided below a longitudinal outer edge of the large structure;
   a connecting jig frame that connects the upper jig frame and the lower jig frame to each other;
   only three supporting parts for supporting the lower jig from below; and
   a jig leg portion that is provided perpendicular to a direction in which the lower jig frame extends and parallel to a ground surface,
   wherein the supporting parts are provided at only three portions that are respectively located under two end portions of the jig leg portion and under the lower jig frame, and
   wherein arrangement positions of the supporting parts provided at the three portions form a substantially triangular shape when seen from above, and
   wherein each of the supporting parts comprises:
   a supporting member that is located above an end portion of the jig leg portion or above the lower jig frame, and that is provided such that the supporting member extends in a direction perpendicular to a direction in which the jig leg portion or the lower jig frame extends;
   a first swing member that is connected to an upper face of the jig leg portion or an upper face of the lower jig frame and that swingably supports the supporting member with respect to the jig leg portion or the lower jig frame at a substantially central portion of the supporting member in a direction in which the supporting member extends such that the supporting member swings about a first axis; and
   legs that are provided under the supporting member and come into contact with the ground surface; and
   wherein an intermediate supporting member is provided under an end portion of the supporting member, and
   wherein an intermediate supporting member is provided under an end portion of the supporting member, and the intermediate supporting member is provided so as to extend in a direction perpendicular to a direction in which the supporting member extends, and wherein each of the supporting parts comprises:
a second swing member that is connected to a lower face of the supporting member and that swingably supports the intermediate supporting member with respect to the supporting member at a substantially central portion of the intermediate supporting member in a direction in which the intermediate supporting member extends such that the intermediate support member swings about a second axis which extends in a direction perpendicular to a direction in which the first axis extends.

2. The assembly jig for use in assembly of a large structure according to claim 1,
Further comprising a second intermediate supporting member.

3. The assembly jig for use in assembly of a large structure according to claim 1, wherein the legs are wheels that roll on the ground surface.

\* \* \* \* \*